Figure 1:
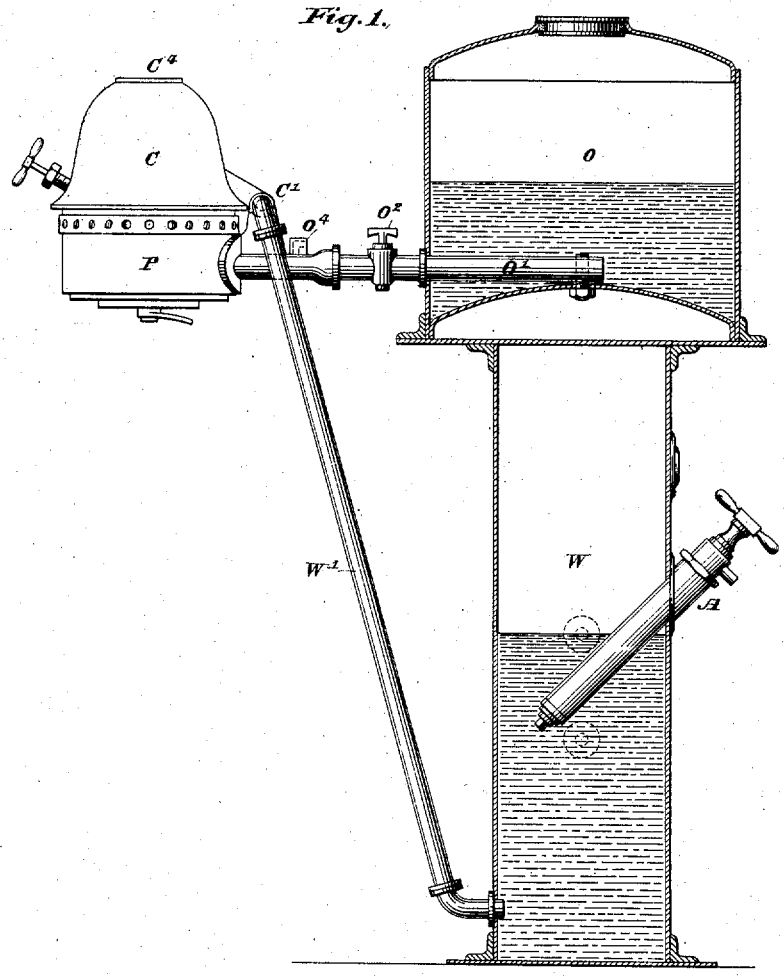

2 Sheets—Sheet 1.

G. S. GRIMSTON

Assignor to THE LUCIGEN LIGHT COMPANY, LIMITED.

VAPOR BURNER.

No. 11,149. Reissued Mar. 10, 1891.

Witnesses
Geo. W. Breck.
Edward Thorpe.

Inventor
George S. Grimston
By his Attorney
Millard Parker Butler

G. S. GRIMSTON. 2 Sheets—Sheet 2.
Assignor to THE LUCIGEN LIGHT COMPANY, LIMITED.
VAPOR BURNER.
No. 11,149. Reissued Mar. 10, 1891.
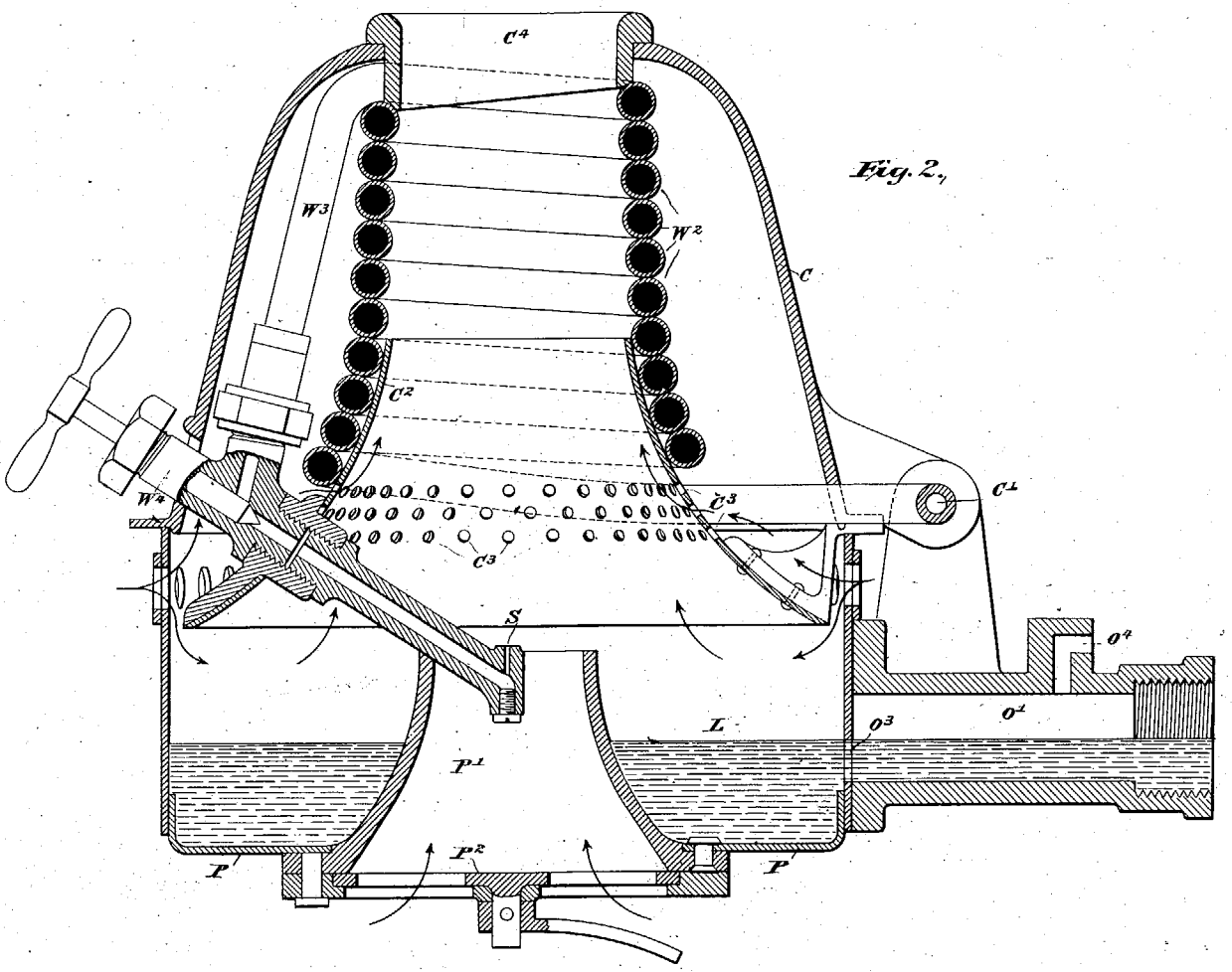
Witnesses
Geo. W. Breck.
Edward Thorpe.
Inventor
George S. Grimston
By his Attorney
Willard Parker Butler

UNITED STATES PATENT OFFICE.

GEORGE S. GRIMSTON, OF GREENWICH, ASSIGNOR TO THE LUCIGEN LIGHT COMPANY, LIMITED, OF WESTMINSTER, ENGLAND.

VAPOR-BURNER.

SPECIFICATION forming part of Reissued Letters Patent No. 11,149, dated March 10, 1891.

Original No. 407,198, dated July 16, 1889. Application for reissue filed January 10, 1890. Serial No. 336,562. Patented in England England November 16, 1888, No. 16,636; in France March 30, 1889, No. 197,104, and in Belgium March 30, 1889, No. 85,619.

*To all whom it may concern:*

Be it known that I, GEORGE SYLVESTER GRIMSTON, a subject of the Queen of Great Britain, residing at Greenwich, in the county of Kent and Kingdom of England, have invented a new and useful Improvement in Vapor-Burners, (for which I have obtained Letters Patent in Great Britain, No. 16,636, dated November 16, 1888; in France, No. 197,104, dated March 30, 1889, and in Belgium, No. 85,619, dated March 30, 1889,) of which the following is a specification.

This invention has for its object the improvement of that class of vapor-burners in which steam is combined with air and oil vapor.

In my apparatus the oil is supplied to a burner, which consists of the following parts: a pan for receiving the oil, above which is a cover of conical form, which radiates heat on the oil and leads the vapor thus produced from the oil into a suitable nozzle. In the cover there are openings admitting air which becomes heated in its passage through them.

For feeding the pan of the burner with oil when used for illuminating purposes, I employ a tank or reservoir having a passage from its bottom to the pan, which is on the same level. The tank being hermetically closed, only a small quantity of oil flows from it into the pan when the level of the oil in the pan falls below the mouth of the passage, allowing a small quantity of air to enter the tank.

In order to produce steam I place a steam-generator in the form of a pipe-coil, as hereinafter described, one end of which is preferably connected to a tank containing water under pressure, and the other end terminates in an injector-jet in the middle of an air-passage in the center of the burner-pan.

Steam generated in the coil issues through the jet and draws in a current of air, and thus a mixed current of air, steam, and oil-vapor is directed through the nozzle of the burner, producing an elongated flame and perfect combustion.

The water-pressure may be obtained by forcing air by means of a small hand-pump into the water-tank.

Instead of employing a water-tank as above described, the coil can be connected to the ordinary water-supply, or where steam is available the coil can be directly supplied with it.

The invention will be best understood by reference to the accompanying drawings, in which—

Figure 1 shows an application of the burner to illuminating purposes, and Fig. 2 an enlarged view of the burner proper.

Similar letters refer to similar parts throughout the several views.

In Fig. 2, P represents the pan for holding the body of hydrocarbon to be consumed, which is preferably in the form of a shallow cylindrical pan, as shown in the views.

In the bottom of the pan is a passage P′ for the admission of air governed by a rotating valve $P^2$. The passage or opening P′ is preferably made in the form of a funnel or a truncated conoid, as shown in Fig. 2. The valve is preferably placed at the bottom, so as to more readily permit of regulation. The passage is made in a separate casting, as shown in Fig. 2, and attached in any convenient manner. The passage P′ terminates just above the level of the oil in the pan, which is kept constant in the manner hereinafter described.

The steam is supplied to the burner by means of any convenient form of jet that will pass upward through the air-passage and discharge the steam with the air just above the level of the hydrocarbon in the pan.

As above stated, the steam may be supplied from any desirable source; but in practice it will be found most convenient for illuminating purposes to generate steam by the following-described agencies. The pan is provided with a cover C, which is hinged at C′, the hinges forming a trunnion with a packed joint for a water-pipe W′, that ascends from the bottom of a water-tank W. The pipe W′ is continued to form convolutions $W^2$ of the pipe-coil, in which steam is generated, and from the top of the coil a pipe $W^3$, governed by a screw-stop valve $W^4$, descends to the steam-jet S, placed in the center of the passage P′. Within the coil $W^2$ is a casing $C^2$, of conoidal form, perforated with holes $C^3$ all around under the coil. At the top of the cover is the flame-orifice $C^4$. This casing being of the same general shape as the air-passage and being directly over it serves also to collect the combustible vapors in the center of the burner, and to increase the draft produced by the air-passages. In the side of the water-tank W is fixed a hand-pump A for compressing air which occupies the upper part of the tank, giving pressure sufficient to force the water up to and through the coil $W^2$. When a supply of water under pressure is available, the tank W and the hand-pump A may be dispensed with, the pipe W′ being simply connected with the water-main and with or without a suitable controlling-valve. The lower part of the flame heats the casing $C^2$ and the coil $W^2$. The heat radiating from the casing $C^2$ on the surface L of the oil maintains the supply of oil vapor. The air entering at $C^3$ is also heated and steam is generated in the coil $W^2$, and after the burner has been a short time in action a powerful elongated flame issues at $C^4$, available for illuminating or heating purposes. The cover C, together with the casing $C^2$, coil $W^2$, the pipe $W^3$, and steam-jet S, can at any time be turned over upon the hinge C′ to give access to the interior of the pan and casing.

In Fig. 1, O represents the tank containing the source of supply. It is placed upon the top of the water-tank W in the manner indicated.

The level L of the oil in the pan P is determined in the following manner: From the bottom of the oil-tank O a passage O′, provided with a stop-cock $O^2$, leads to the pan P; but only the lower part of the mouth of this passage is open, as indicated at $O^3$. When the level of the oil in the pan falls below that in the passage O′, air can enter by a port $O^4$ and find its way into the reservoir O, allowing the flow of a small quantity of oil to the pan.

The operation of the burner will be obvious from the foregoing description.

Referring now to the application of the burner to a lamp for illuminating purposes, as shown in Fig. 1, the lamp is ignited through the opening $C^4$ of the cover, and as soon as the coil $W^2$ or other steam-generating device becomes sufficiently heated, water is forced into it by giving a few pushes to the handle of the force-pump A. As soon as the steam is generated the handle of the valve $W^4$ is turned and steam admitted to the burner, and at the same time the air-port $P^2$ is opened. When the hydrocarbon in the pan begins to give off vapors, these vapors will become mingled with the steam and air, and perfect combustion will ensue. As the operation continues, the steam will be generated immediately at the inlet end of the generator, and during its passage therethrough will become heated and will issue superheated at the jet S. The amount of air can be readily controlled by the valve $P^2$, and to supply water to the steam-generator it is only necessary to give an occasional push to the handle of the hand-pump. The absence of water in the generator will at once be made apparent by the diminution of the flame, and as the steam is constantly escaping there can be no danger of explosion.

All expansion and complicated air compressing or pumping machinery are dispensed with, and it will be obvious that the various parts of the burner, being perfectly simple, can be cheaply constructed, and readily replaced as they become worn out.

I claim as my invention—

1. In a vapor-burner, the combination, substantially as hereinbefore set forth, of an oil-pan provided with an air-passage in the bottom, a burner-cover with a flame-orifice at the top surmounting the pan, a steam-coil in the cover connecting with a steam-jet projecting upward through the air-passage and discharging within the pan, and a conoidal casing within the burner-cover, for the purposes set forth.

2. In a vapor-burner, the combination, substantially as hereinbefore set forth, of an oil-pan provided with an air-passage in its bottom, means, substantially as described, for regulating the amount of air admitted therethrough, a burner-cover having a flame-orifice at the top surmounting the pan, a steam-coil in the cover connecting with a steam-jet projecting upward in the air-passage and discharging within the pan in close proximity to the surface of the oil therein, and a conoidal casing within the burner-cover, for the purposes set forth.

3. In a vapor-burner, the combination, substantially as hereinbefore set forth, of an oil-pan provided with a central air-passage in its bottom, a movable burner-cover having a flame-orifice at its top and hinged to the pan and surmounting the same, a steam-coil within the cover connecting with a steam-jet projecting upward through the air-passage and discharging within the pan, and a conoidal casing within the burner-cover, for the purposes set forth.

4. In a vapor-burner, the combination, substantially as hereinbefore set forth, of an oil-pan having one or more openings around its edge above the surface of the oil, whereby air is admitted to the interior of the pan, and having an air-passage in its bottom, a burner-cover having a flame-orifice at its top surmounting the pan, a steam-coil in the cover connecting with a steam-jet projecting upward in the air-passage and discharging within the pan, and a conoidal casing provided with one or more openings therein for the passage of air, for the purposes set forth.

5. In a vapor-burner, the combination, substantially as hereinbefore set forth, of an oil-pan provided with an air-passage in its bottom, a burner-cover having a flame-orifice at its top surmounting the pan, a steam-coil in the cover connecting with a steam-jet projecting upward through the air-passage and discharging within the pan, a conoidal casing within the burner-cover, and a closed oil-reservoir connecting with the oil-pan by a horizontal pipe and an air-port in said pipe, for the purposes set forth.

6. In a vapor-burner, the combination, substantially as hereinbefore set forth, of an oil-pan provided with an air-passage in its bottom, as set forth, a burner-cover with a flame-orifice at the top, a steam-coil within said cover, a steam-jet passing upward through the air-passage and discharging within the pan connected with the steam-coil, a conoidal casing within the burner-cover, and a suitable valve for regulating the supply of steam admitted.

7. In a vapor-burner, the combination, substantially as hereinbefore set forth, of an oil-pan provided with an air-passage at its bottom, as set forth, of a burner-cover with a flame-orifice at the top, a steam-coil within said cover, a steam-jet passing upward through the air-passage and discharging within the pan connected with the steam-coil, a conoidal casing within the burner-cover, and a suitable source of water-supply connected with the steam-coil.

8. In a vapor-burner, the combination, substantially as hereinbefore set forth, of an oil-pan having an air-opening at its bottom, a hinged burner-cover having a flame-orifice at the top, a steam-coil in the interior of the cover, a conoidal casing within the same, and a bent pipe provided with a suitable discharge-nozzle connected with said coil arranged to pass into the interior of the burner in such a manner that steam is discharged within the pan at the extremity of the air-opening and in proximity to the surface of the oil in the pan.

9. In a vapor-burner, the combination, substantially as hereinbefore set forth, of an oil-pan having an air-opening at its bottom, a hinged burner-cover having a flame-orifice at the top, a steam-coil in the interior of the cover, a conoidal casing within the same, a bent pipe provided with a suitable discharge-nozzle, whereby steam is discharged into the burner in proximity to the surface of the oil in the pan, and a valve in said pipe for controlling the amount of steam admitted without removing the cover.

10. In a vapor-burner, the combination of a closed oil-reservoir, a burner provided with a series of perforations around its upper edge having a central air-opening in its bottom and supported on a level with the oil-reservoir, a hinged burner-cover having a flame-orifice at the top and containing a perforated inner conoidal casing also terminating at the top in a flame-orifice, a steam-coil located in said cover and having at its lower end a steam-jet that projects upward in the center of the burner, a valve for controlling the steam-jet, and a pipe leading from the lower part of the oil-reservoir to the lower part of the burner and provided at its top with an air-inlet to the oil-reservoir, substantially as described.

11. In a vapor-burner, the combination of a closed oil-reservoir, a burner provided with a series of perforations around its upper edge having in its bottom a central air-passage controlled by a valve, a pipe leading from the lower part of the oil-reservoir to the lower part of the burner and communicating therewith only at the lower part of said pipe, which is provided in its upper part with an air-inlet to the oil-reservoir, a hinged burner-cover having a flame-orifice in its top, an inner perforated conoidal casing supported by the cover and also having a flame-orifice in its top, a steam-coil supported in the cover having at its lower end a steam-jet that projects upward in the center of the burner, a valve for controlling the steam-jet, and a pipe communicating with the steam-coil through the hinge-joint of the burner-cover, substantially as described.

12. In a vapor-burner, the combination of a closed oil-receptacle, a burner provided with a series of perforations around its upper edge on a level with said reservoir, a pipe leading from the lower part of the reservoir to the lower part of the lamp and having an air-inlet to the reservoir, a hinged burner-cover having a flame-orifice, a perforated and open top casing, a steam-generating coil supported in the cover and having at its lower end a steam-jet that projects upward in the center of the burner, a water-tank having a pipe communicating with the steam-coil through the hinge-joint of the cover, and a pump connected to the water-tank, substantially as described.

Signed at No. 17 Gracechurch Street, in the city of London, England, this 17th day of December, 1889, in the presence of two witnesses.

GEO. S. GRIMSTON.

Witnesses:

JNO. P. M. MILLARD,

*Clerk to Messrs. Abel & Imray, Consulting Engineers and Patent Agents, 28 Southampton Buildings, London, W. C.*

GEO. J. B. FRANKLIN,

*Clerk to Messrs. Severn & Harris, Notaries Public, 17 Gracechurch Street, London, E. C.*